(12) United States Patent
Zeigler et al.

(10) Patent No.: US 8,517,087 B2
(45) Date of Patent: Aug. 27, 2013

(54) COMBINED HEATING AND AIR CONDITIONING SYSTEM FOR VEHICLES

(75) Inventors: Terry A. Zeigler, Byron, IL (US); John S. Bracey, Rockford, IL (US); Brett Sean Connell, Winnebago, IL (US); Scott Sloan, Freeport, IL (US)

(73) Assignee: Bergstrom, Inc., Rockford, IL (US)

( * ) Notice: Subject to any disclaimer, the term of this patent is extended or adjusted under 35 U.S.C. 154(b) by 1927 days.

(21) Appl. No.: 11/676,870

(22) Filed: Feb. 20, 2007

(65) Prior Publication Data

US 2008/0196877 A1 Aug. 21, 2008

(51) Int. Cl.
*B60H 1/00* (2006.01)
*F25B 13/00* (2006.01)

(52) U.S. Cl.
USPC ......... 165/202; 62/324.1; 62/324.2; 62/324.6

(58) Field of Classification Search
USPC ............. 165/202, 203, 204; 62/324.1, 324.2, 62/324.6, 259.1
See application file for complete search history.

(56) References Cited

U.S. PATENT DOCUMENTS

| | | | | |
|---|---|---|---|---|
| 3,029,614 A | * | 4/1962 | Klatt et al. | 62/324.6 |
| 3,150,501 A | * | 9/1964 | Moore | 62/324.6 |
| 3,209,551 A | * | 10/1965 | Jentet | 165/202 |
| 3,590,910 A | | 7/1971 | Lorenz | |
| 3,627,030 A | | 12/1971 | Lorenz | |
| 3,844,130 A | | 10/1974 | Wahnish | |
| 3,995,443 A | | 12/1976 | Iversen | |
| 4,015,182 A | | 3/1977 | Erdman | |
| 4,173,865 A | * | 11/1979 | Sawyer | 62/324.6 |
| 4,263,785 A | * | 4/1981 | Barniak et al. | 62/335 |
| 4,293,092 A | * | 10/1981 | Hatz et al. | 62/238.6 |
| 4,295,344 A | * | 10/1981 | Hannett et al. | 62/238.6 |
| 4,324,286 A | | 4/1982 | Brett | |

(Continued)

FOREIGN PATENT DOCUMENTS

| | | |
|---|---|---|
| EP | 1329344 A1 | 7/2003 |
| JP | 5032121 A | 2/1993 |

(Continued)

OTHER PUBLICATIONS

Michael Löhle, Günther Feuerecker and Ulrich Salzer; Non Idling HVAC-module for Long Distance Trucks; SAE Technical Paper Series 1999-01-1193; International Congress and Exposition, Detroit, Michigan; Mar. 1-4, 1999; 8 pages.

(Continued)

*Primary Examiner* — Ljiljana Ciric
(74) *Attorney, Agent, or Firm* — Reinhart Boerner Van Deuren P.C.

(57) ABSTRACT

An HVAC system for heating and cooling a passenger compartment of a vehicle includes a first heat exchanger that transfers heat between a primary loop and a secondary loop. The primary loop is a reversible loop and uses high pressure refrigerant. A compressor pressurizes the refrigerant. A second heat exchanger selectively transfers heat energy to and from the passenger compartment. The secondary loop is a low pressure liquid coolant loop that passes through the first heat exchanger. A pump moves fluid through the secondary loop. A third heat exchanger transfers heat to and from an external medium from the fluid passing through the secondary loop. A secondary heat source adds heat to the secondary loop during a heating mode. A bypass means selectively bypasses the secondary heat source during a cooling mode.

20 Claims, 4 Drawing Sheets

(56) References Cited

U.S. PATENT DOCUMENTS

| | | | |
|---|---|---|---|
| 4,351,161 A * | 9/1982 | Jones | 62/235.1 |
| 4,359,875 A | 11/1982 | Ohtani | |
| 4,409,796 A * | 10/1983 | Fisher | 62/238.6 |
| 4,430,864 A * | 2/1984 | Mathiprakasam | 62/324.1 |
| 4,459,519 A | 7/1984 | Erdman | |
| 4,483,156 A * | 11/1984 | Oudenhoven | 62/324.1 |
| 4,493,193 A * | 1/1985 | Fisher | 62/324.1 |
| 4,514,990 A * | 5/1985 | Sulkowski | 62/324.1 |
| 4,553,401 A * | 11/1985 | Fisher | 62/238.6 |
| 4,562,700 A * | 1/1986 | Atsumi et al. | 62/174 |
| 4,577,679 A | 3/1986 | Hibshman | |
| 4,598,557 A * | 7/1986 | Robinson et al. | 62/238.6 |
| 4,604,036 A | 8/1986 | Sutou et al. | |
| 4,616,484 A * | 10/1986 | Mehdi et al. | 62/238.6 |
| 4,645,908 A * | 2/1987 | Jones | 392/340 |
| 4,658,593 A | 4/1987 | Stenvinkel | |
| 4,667,480 A | 5/1987 | Bessler | |
| 4,676,072 A * | 6/1987 | Higuchi | 62/175 |
| 4,693,089 A * | 9/1987 | Bourne et al. | 62/238.6 |
| 4,694,798 A | 9/1987 | Kato et al. | |
| 4,716,741 A * | 1/1988 | Bednarek | 62/324.6 |
| 4,742,689 A * | 5/1988 | Lowes | 62/197 |
| 4,854,130 A * | 8/1989 | Naruse et al. | 62/352 |
| 4,856,078 A | 8/1989 | Konopka | |
| 4,939,910 A * | 7/1990 | Umezu et al. | 62/160 |
| 5,009,077 A * | 4/1991 | Okoshi et al. | 62/160 |
| 5,025,634 A | 6/1991 | Dressler | |
| 5,050,396 A * | 9/1991 | Ohkoshi et al. | 62/160 |
| 5,065,586 A * | 11/1991 | Shapiro-Baruch | 62/93 |
| 5,067,652 A | 11/1991 | Enander | |
| 5,092,134 A * | 3/1992 | Tagashira et al. | 62/155 |
| 5,142,879 A * | 9/1992 | Nakamura et al. | 62/160 |
| 5,170,639 A | 12/1992 | Datta | |
| 5,237,833 A * | 8/1993 | Hayashida et al. | 62/324.6 |
| 5,275,012 A | 1/1994 | Dage et al. | |
| 5,309,733 A * | 5/1994 | Hayashida et al. | 62/278 |
| 5,316,074 A | 5/1994 | Isaji et al. | |
| 5,347,826 A * | 9/1994 | Hayashida et al. | 62/197 |
| 5,361,593 A | 11/1994 | Dauvergne | |
| 5,376,866 A | 12/1994 | Erdman | |
| 5,381,671 A * | 1/1995 | Saito et al. | 62/430 |
| 5,388,422 A * | 2/1995 | Hayashida et al. | 62/211 |
| 5,396,779 A | 3/1995 | Voss | |
| 5,465,589 A | 11/1995 | Bender et al. | |
| 5,490,399 A * | 2/1996 | Sada | 62/510 |
| 5,497,941 A | 3/1996 | Numazawa et al. | |
| 5,501,267 A | 3/1996 | Iritani et al. | |
| 5,502,365 A | 3/1996 | Nanbu et al. | |
| 5,524,442 A | 6/1996 | Bergman, Jr. et al. | |
| 5,528,901 A | 6/1996 | Willis | |
| 5,562,538 A | 10/1996 | Suyama | |
| 5,568,732 A * | 10/1996 | Isshiki et al. | 62/129 |
| 5,586,613 A | 12/1996 | Ehsani | |
| 5,657,638 A | 8/1997 | Erdman et al. | |
| 5,682,757 A | 11/1997 | Peterson | |
| 5,782,610 A | 7/1998 | Ikeda | |
| 5,819,549 A | 10/1998 | Sherwood | |
| 5,848,537 A * | 12/1998 | Biancardi et al. | 62/324.6 |
| 5,898,995 A | 5/1999 | Ghodbane | |
| 5,899,081 A | 5/1999 | Evans et al. | |
| 5,899,086 A * | 5/1999 | Noda et al. | 62/244 |
| 5,901,572 A | 5/1999 | Peiffer et al. | |
| 5,901,780 A | 5/1999 | Zeigler et al. | |
| 5,921,092 A | 7/1999 | Behr et al. | |
| 5,927,087 A * | 7/1999 | Ishikawa | 62/174 |
| 5,934,089 A | 8/1999 | Nakagawa et al. | |
| 5,996,368 A * | 12/1999 | Kim | 62/324.6 |
| 6,016,662 A | 1/2000 | Tanaka et al. | |
| 6,028,406 A | 2/2000 | Birk | |
| 6,035,658 A * | 3/2000 | Launois et al. | 62/324.1 |
| 6,038,877 A | 3/2000 | Peiffer et al. | |
| 6,047,770 A * | 4/2000 | Suzuki et al. | 165/202 |
| 6,059,016 A | 5/2000 | Rafalovich et al. | |
| 6,089,034 A | 7/2000 | Lake et al. | |
| 6,112,535 A | 9/2000 | Hollenbeck | |
| 6,134,901 A | 10/2000 | Harvest et al. | |
| 6,152,217 A | 11/2000 | Ito et al. | |
| 6,205,795 B1 | 3/2001 | Backman et al. | |
| 6,230,507 B1 | 5/2001 | Ban et al. | |
| 6,253,563 B1 | 7/2001 | Ewert et al. | |
| 6,276,161 B1 | 8/2001 | Peiffer et al. | |
| 6,405,793 B1 | 6/2002 | Ghodbane et al. | |
| 6,411,059 B2 | 6/2002 | Frugier et al. | |
| 6,415,625 B1 * | 7/2002 | Rockenfeller et al. | 62/324.2 |
| 6,453,678 B1 | 9/2002 | Sundhar | |
| 6,457,324 B2 | 10/2002 | Zeigler et al. | |
| 6,467,279 B1 | 10/2002 | Backman et al. | |
| 6,516,623 B1 | 2/2003 | Collier | |
| 6,530,426 B1 | 3/2003 | Kishita et al. | |
| 6,543,531 B1 * | 4/2003 | Casar et al. | 165/202 |
| 6,626,003 B1 | 9/2003 | Kortüm et al. | |
| 6,681,588 B2 | 1/2004 | Zeigler | |
| 6,745,585 B2 | 6/2004 | Kelm et al. | |
| 6,862,892 B1 * | 3/2005 | Meyer et al. | 62/244 |
| 6,889,762 B2 | 5/2005 | Zeigler et al. | |
| 6,913,067 B2 * | 7/2005 | Hesse | 165/202 |
| 6,939,114 B2 | 9/2005 | Iwanami et al. | |
| 6,981,544 B2 | 1/2006 | Iwanami et al. | |
| 7,013,666 B2 * | 3/2006 | Park et al. | 62/324.6 |
| 7,048,044 B2 * | 5/2006 | Ban et al. | 165/202 |
| 7,055,590 B2 * | 6/2006 | Hara | 165/202 |
| 7,063,137 B2 | 6/2006 | Kadle et al. | |
| 7,069,983 B2 * | 7/2006 | Yakumaru et al. | 165/202 |
| 7,100,384 B2 * | 9/2006 | Leuthner et al. | 62/324.6 |
| 7,152,422 B2 * | 12/2006 | Takano et al. | 62/238.6 |
| 7,181,917 B2 * | 2/2007 | Hwang et al. | 62/115 |
| 7,181,919 B2 * | 2/2007 | Uno et al. | 62/157 |
| 7,182,129 B2 * | 2/2007 | Karl | 165/202 |
| 7,185,506 B2 * | 3/2007 | Aflekt et al. | 62/324.6 |
| 7,418,824 B2 * | 9/2008 | Uno et al. | 62/238.6 |
| 7,444,962 B2 * | 11/2008 | Engelin et al. | 123/41.1 |
| 7,530,390 B2 * | 5/2009 | Feuerecker et al. | 165/202 |
| 7,536,869 B2 * | 5/2009 | Inaba et al. | 62/238.6 |
| 7,739,881 B2 * | 6/2010 | Matsunaga et al. | 62/200 |
| 7,748,226 B2 * | 7/2010 | Iwanami et al. | 62/238.7 |
| 7,975,501 B2 * | 7/2011 | Borghi | 165/202 |
| 8,079,229 B2 * | 12/2011 | Lifson et al. | 62/238.6 |
| 8,156,752 B2 * | 4/2012 | Matsuoka et al. | 62/238.7 |
| 8,297,073 B2 * | 10/2012 | Kawano et al. | 62/468 |
| 2001/0010261 A1 | 8/2001 | Oomura et al. | |
| 2002/0026801 A1 | 3/2002 | Yamashita | |
| 2002/0084769 A1 | 7/2002 | Iritani et al. | |
| 2002/0108384 A1 | 8/2002 | Higashiyama | |
| 2002/0157413 A1 | 10/2002 | Iwanami et al. | |
| 2003/0041603 A1 | 3/2003 | Tada et al. | |
| 2003/0106332 A1 | 6/2003 | Okamoto | |
| 2003/0177778 A1 * | 9/2003 | Hesse | 62/324.1 |
| 2003/0230100 A1 * | 12/2003 | Hwang, II | 62/184 |
| 2004/0035133 A1 * | 2/2004 | Park et al. | 62/324.1 |
| 2004/0168449 A1 | 9/2004 | Homan et al. | |
| 2005/0161211 A1 | 7/2005 | Zeigler et al. | |
| 2005/0178523 A1 | 8/2005 | Itoh et al. | |
| 2005/0204768 A1 * | 9/2005 | Di Vito et al. | 62/324.1 |
| 2006/0053814 A1 * | 3/2006 | Naik et al. | 165/202 |
| 2006/0102333 A1 | 5/2006 | Zeigler et al. | |
| 2006/0137388 A1 * | 6/2006 | Kakehashi et al. | 62/513 |
| 2006/0151163 A1 | 7/2006 | Zeigler et al. | |
| 2006/0151164 A1 | 7/2006 | Zeigler et al. | |
| 2007/0131408 A1 | 6/2007 | Zeigler et al. | |
| 2008/0148748 A1 * | 6/2008 | Viegas et al. | 62/259.1 |
| 2010/0229578 A1 * | 9/2010 | Borghi | 62/324.6 |
| 2011/0232890 A9 * | 9/2011 | Gering et al. | 165/202 |

FOREIGN PATENT DOCUMENTS

| | | |
|---|---|---|
| JP | 2000108651 A | 4/2000 |
| JP | 2002081823 A | 3/2002 |
| WO | WO 99/61269 | 12/1999 |
| WO | WO 03/051657 A1 | 6/2003 |

OTHER PUBLICATIONS

Mahmoud Ghodbane; On Vehicle Performance of a Secondary Loop A/C System; SAE Technical Paper Series 2000-01-1270; SAE 2000 World Congress, Detroit, Michigan; Mar. 6-9, 2000; 6 pages.

Masami Konaka and Hiroki Matsuo; SAE Technical Paper Series 2000-1-1271; SAE 2000 World Congress, Detroit, Michigan; Mar. 6-9, 2000; 6 pages.

Frank Stodolsky, Linda Gaines, and Anant Vyas; Analysis of Technology Options to Reduce the Fuel Consumption of Idling Trucks; Paper-Center for Transportation Research, Energy Systems Division, Argonne National Laboratory, 9700 South Cass Avenue, Argonee, Illinois 60439; Jun. 2000; 30 pages.

Patricia Gardie and Vincent Goetz; Thermal EnergyStorage System by Solid Absorption for Electric Automobile Heating and Air-Conditioning; Paper; 5 pages.

TropiCool No-idle Heating & Cooling, 110V/12V High-efficiency, Self-contained, Electrified Heating/AC System; ACC Climate Control Brochure, Elkhart, Indiana; 1 page.

TropiCool Power Plus, More comfort. More efficiency. More options.; ACC Climate Control Brochure, Elkhart, Indiana; 3 pages.

Packless Industries, the leader in refrigerant to water coaxial heat exchangers, flexible hoses and sucti . . . ; website—http://www.packless.com/profile.html; date last visited Aug. 9, 2007; 1 page.

FlatPlate Heat Exchangers; GEA FlatPlate Inc.; website—http://www.flatplate.com/profile.htm; date last visited Aug. 9, 2007; 3 pages.

Alfa Laval website http://www.alfalaval.com/ecoreJava/WebObjects/ecoreJava.woa/wa/showNode?siteNodelID=1668&cont . . . ; date last visited May 18, 2007; 1 page.

* cited by examiner

COMBINED HEATING AND AIR CONDITIONING SYSTEM FOR VEHICLES

FIELD OF THE INVENTION

This invention generally relates to air conditioning systems. More particularly, this invention relates to vehicle mounted air conditioning systems for over the road vehicles.

BACKGROUND OF THE INVENTION

In today's fast-paced, on-the-move society, buses are used to transport a large number of people from location to location. Bus manufacturers have continued to increase their emphasis on ergonomic factors in the design and manufacture of their vehicles. Indeed, the passenger compartment of a modern bus contains many features to improve the passenger's comfort. These features include, for example, audio and video systems, improved seats, including variable position seating, lumbar supports in the seats, increased sound insulation, and heating, ventilation, and air conditioning systems (HVAC systems) that provide a comfortable environment for a large quantity of passengers.

To condition the air of the passenger compartment, many of the HVAC systems in buses employ a heating system separate from the cooling system. Many heating systems use heat generated from the engine of the bus to heat the passenger compartment. Unfortunately, this requires the engine to be running or turned on and off to heat the passenger compartment. The cooling system typically uses a high-pressure refrigerant system. Many of these refrigerant systems have engine-belt driven compressors. While these engine-belt driven compressors are well-suited to circulate and pump refrigerant through the refrigerant system while the engine is running, they are not able to operate when the engine is turned off. As a result, the cooling system cannot cool the passenger compartment unless the engine of the bus is left running.

Unfortunately, leaving the engine running simply to condition the air in the passenger compartment wastes money and increases the pollution produced over the life of the bus. This is particularly relevant to buses because buses may be occupied while not moving for extended periods of time, such as when the bus is waiting for passengers to load the bus, specifically when the bus is waiting for the passengers to exit an event.

To address this problem with other vehicles such as over-the-road trucks, the newest trucks are manufactured with no-idle heating and air conditioning systems. The no-idle heating and air conditioning systems are able to provide cooling and/or heating of the passenger compartment when the engine of the vehicle is turned off. Such no-idle heating and air conditioning units typically use a high pressure refrigerant system with an electric powered motor-driven, variable speed compressor powered by one or more batteries, shore power and the like instead of the primary engine belt. By using a motor-driven compressor, the no-idle heating and air conditioning system is able to heat and/or cool the passenger compartment even when the engine in the vehicle is turned off.

Unfortunately, while in the engine off condition, some no-idle systems are not capable of providing both heating as well as cooling in an engine off condition using a single circuit. These systems require a second system to provide a heat source during the engine off condition, typically utilizing a fuel fired heater. Unfortunately, this increases the amount of space required for the entire HVAC system.

Another problem with standard cooling systems that these high pressure refrigerant systems use couplings which makes the system prone to leaks. Further, because the refrigeration system is not closed until assembly of the vehicle takes place within the manufacturing assembly facility, the use of this type of system further burdens the assembly manufacturer by requiring that the initial purging and charging of the refrigeration system take place within the assembly plant of the vehicle itself increasing the manufactures' costs to manufacture the vehicle and requiring the manufacturer to maintain and store a high quantity of refrigerant.

Thus, it would be appreciated in the art if a HVAC system for a vehicle could have a system that provides both heating and cooling functions without requiring the engine to be running, that is more efficient, that reduces the likelihood of leaks in the high-pressure refrigerant.

BRIEF SUMMARY OF THE INVENTION

In view of the above, it is an object of an embodiment of the present invention to provide a new and improved heating and air condition system for the passenger compartment of a vehicle. More particularly, it is an aspect of an embodiment of the present invention to provide a new and improved heating and air conditioning system that provides heating and cooling of the vehicle in an engine on and in an engine off condition In an embodiment of the present invention, the heating and air conditioning system includes a primary loop and a secondary loop thermally connected to one another by a common heat exchanger. The primary and secondary loops pass heat energy between one another in a direction depending on if the system is in a heating mode or a cooling mode.

In addition to including the common heat exchanger, one embodiment includes a primary loop that comprises another heat exchanger, a refrigerant compressor, a plurality of valves, a plurality of refrigerant metering devices and a flow reversing valve. The secondary loop generally includes, in addition to the common heat exchanger, another heat exchanger, a liquid pump, a secondary heat source, and a circuit for selectively bypassing the secondary heat source.

In an embodiment, the primary loop is a high pressure refrigerant loop and the secondary loop is a low pressure liquid loop.

In an embodiment, the primary loop is a heat pump such that it may function to provide both cooling and heating of the passenger compartment of the vehicle by reversing the flow of the refrigerant through the primary loop. In this embodiment, the secondary loop preferably passes through the secondary heat source during heating and bypasses the secondary heat source during cooling.

In yet a further embodiment of the present invention, the secondary heat source is remote from the primary loop and may include the engine of the vehicle, a fuel fired heater, or an electric heater. The secondary heat source functions to add heat energy to the primary loop during a heating mode to increase the efficiency of the heating mode of the primary loop.

In a further embodiment, the liquid pump and the refrigerant compressor are electrically driven. This allows the heating and air conditioning system of an embodiment of the present invention to function as a no-idle system.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF EMBODIMENTS OF THE INVENTION

Figure 1:
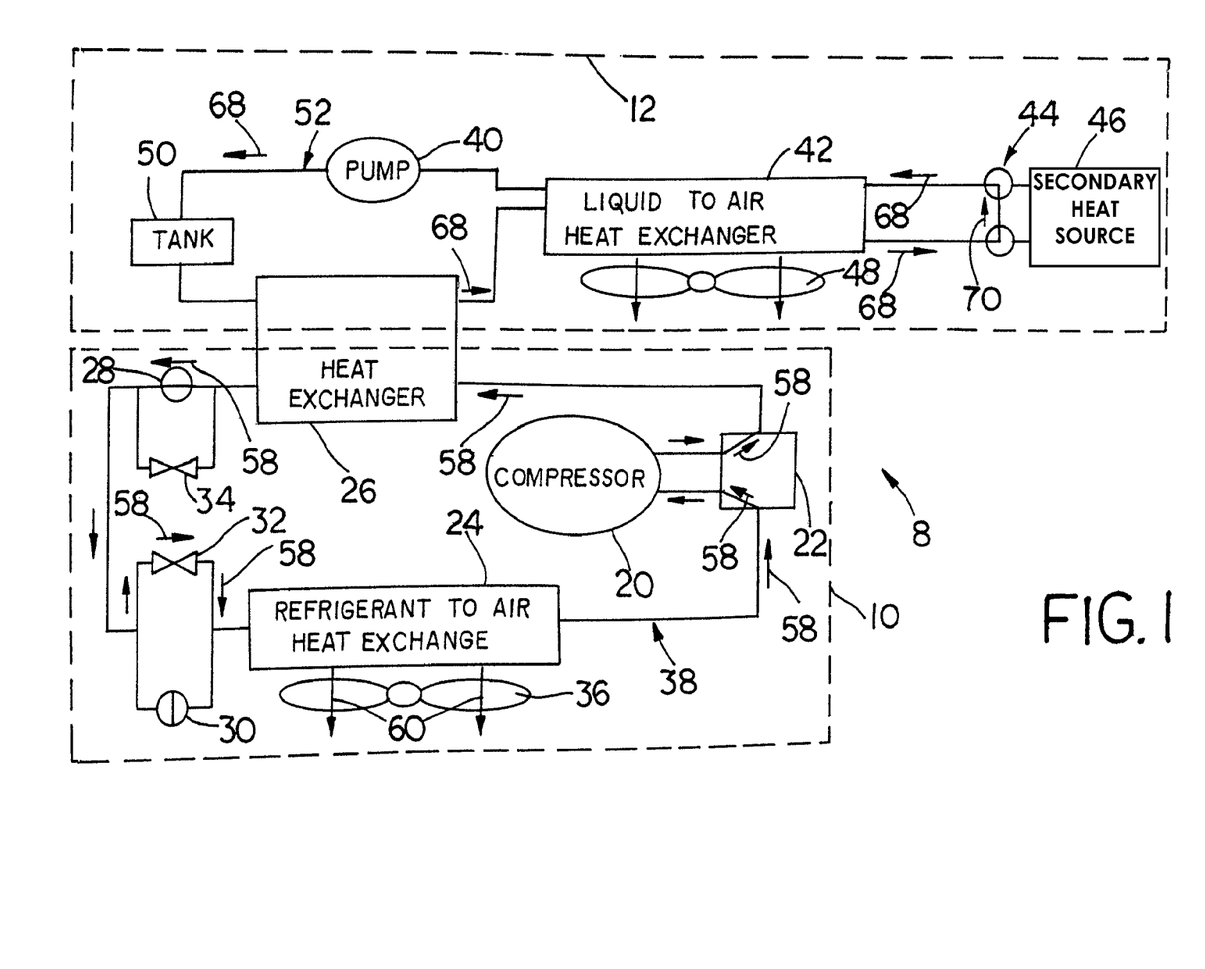
FIG. 1 is a simplified block diagram illustrating an exemplary embodiment of a combined HVAC system constructed in accordance with the teachings of the present invention, wherein the heating and air conditioning system is in an air conditioning mode.

FIG. 1 illustrates a simplified block diagram of a preferred embodiment of a heating, ventilation and air conditioning system (HVAC system), indicated as a whole as 8, for heating, ventilating and cooling a passenger compartment of a vehicle, preferably a passenger compartment of a bus. For the heating and cooling functions, the HVAC system 8 utilizes a primary heating and air condition loop (hereinafter the primary loop), indicated as a whole as 10, that is assisted by a parallel secondary heating and cooling loop (hereinafter the secondary loop), indicated as a whole as 12. The primary loop 10 is a heating and air conditioning heat pump system utilizing a high pressure refrigerant process to either heat or cool the passenger compartment. A heat pump operates to transfer heat from one medium to another. The secondary loop 12 is a low pressure liquid system that selectively transfers heat from or to the primary loop 10.

The primary loop 10 is a high pressure refrigerant heat pump system and in an exemplary embodiment includes a compressor 20, a reversing valve 22, a refrigerant-to-air heat exchanger 24, a refrigerant-to-liquid heat exchanger 26, first and second bypass valves 28 and 30, first and second refrigerant metering devices 32 and 34, and a first air movement device 36. The components of the primary loop 10 are operably coupled by, for example, tubing or suction line 38 to form the heat pump system that transfers heat energy from one location to another.

Figure 2:
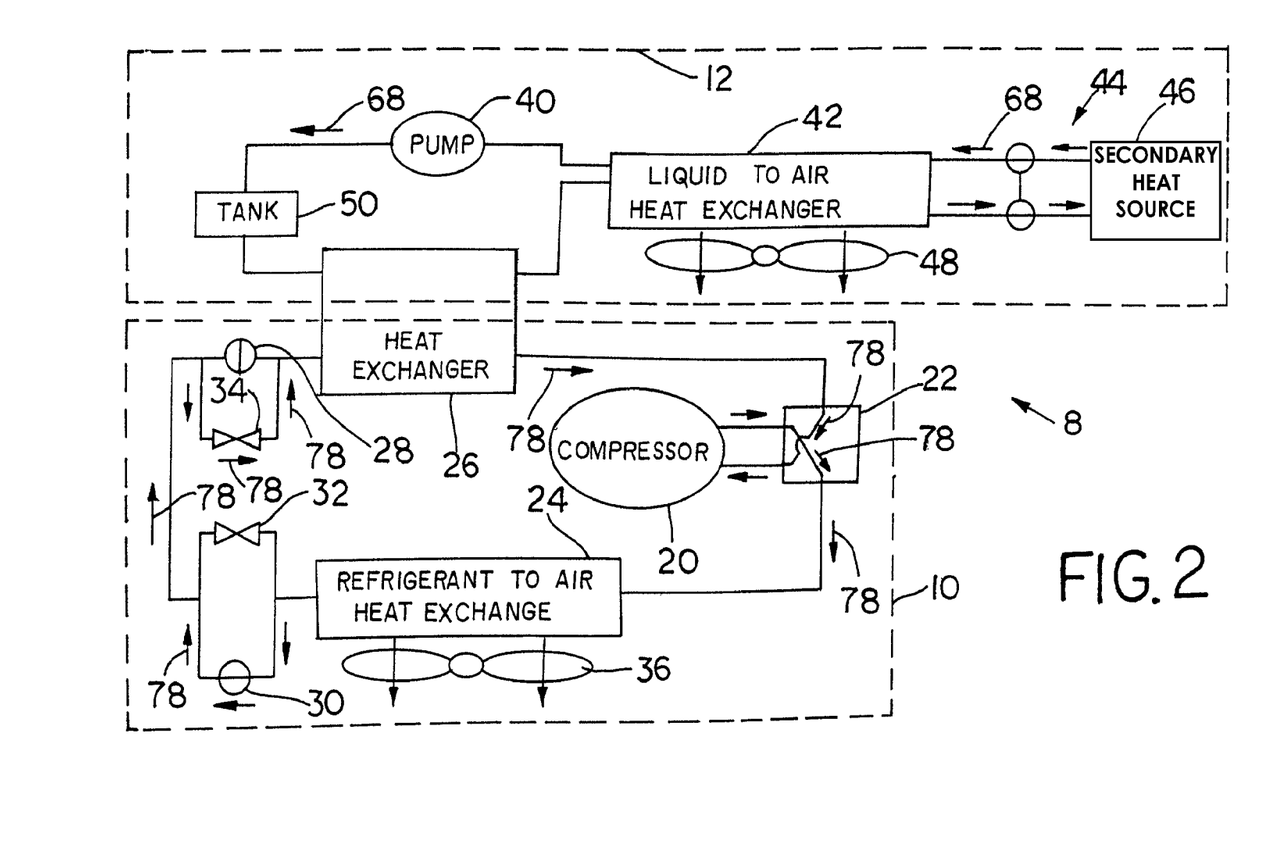
FIG. 2 is a simplified block diagram illustrating the HVAC system of FIG. 1 in a heating mode.

The secondary loop 12 operates to selectively transfer heat energy from the primary loop 10 during the cooling mode and to the primary loop 10 during the heating mode (see FIG. 2). Heat is transferred between the primary and secondary loops 10 and 12 via the refrigerant-to-liquid heat exchanger 26. Therefore, the refrigerant-to-liquid heat exchanger 26 is a component of both the primary loop 10 and the secondary loop 12. The secondary loop 12 further includes a liquid pump 40, a liquid-to-air heat exchanger 42, a third bypass valve 44, a secondary heat source 46, a second air movement device 48 and a purge tank 50. The components of the secondary loop 12 are operably coupled by, for example, tubing or suction line, indicated as 52, to form a fluid circuit.

For ease of understanding, an embodiment of the invention and its components will be first described with reference to FIG. 1 in which the HVAC system 8 is in the air conditioning mode ("A/C mode") to cool the air in the passenger compartment of a vehicle. Then the description will describe operation in a heating mode with reference to FIG. 2.

Beginning with the primary loop 10, the first and second refrigerant metering devices 32 and 34 are devices that permit a high-temperature, high-pressure liquid refrigerant (e.g., R-134a, Freon, and the like) flowing through the primary loop 10 to be changed to a low temperature, low pressure liquid refrigerant. During the A/C mode, fluid passes only through the first refrigerant metering device 32 and bypasses the second refrigerant metering device 34 as it passes through bypass valve 28. In a preferred embodiment, the refrigerant metering devices 32, 34 are expansion valves, thermostatic expansion valves, and the like.

In the A/C mode, the refrigerant-to-air heat exchanger 24, functions as an evaporator, and is disposed downstream of the first refrigerant metering device 32 (with respect to the flow of the refrigerant through the primary loop 10, indicated by arrows 58). The refrigerant-to-air heat exchanger 24 is a heat exchanging device that receives low temperature, low pressure liquid refrigerant from the first refrigerant metering device 32. While flowing through the refrigerant-to-air heat exchanger 24, the low temperature, low pressure liquid refrigerant absorbs latent heat from a medium, typically air, identified by arrows 60, that is circulated through the passenger compartment. As such the refrigerant-to-air heat exchanger 24 is positioned in fluid communication with the interior of the passenger compartment. Due to the absorption of heat from air 60, the low temperature, low pressure liquid refrigerant cools the air 60 and, undergoes a phase change by boiling into a low-temperature, low-pressure vapor refrigerant. To increase the efficiency of this heat exchanging process between the air and the refrigerant, in a preferred embodiment the refrigerant-to-air heat exchanger 24 is a coil.

The first air movement device 36 is disposed proximate the refrigerant-to-air heat exchanger 24 and is configured to move and/or draw air 60 through the refrigerant-to-air heat exchanger 24. After passing through the refrigerant-to-air heat exchanger 24 and cooled, the cooled air is expelled into the passenger compartment of the vehicle. In a preferred embodiment, the first air movement device 36 is a fan such as, for example, an axial fan. Furthermore, the fan is preferably adjustable such that the amount of air passing through the refrigerant-to-air heat exchanger 24 is variable depending on the cooling needs of the passenger compartment. In another embodiment, the air movement device 36 may draw a portion of fresh external air into the vehicle as well as circulate air from within the passenger compartment to provide ventilation of the vehicle.

The compressor 20 compresses the low-pressure, low-temperature vapor refrigerant received and/or drawn from the evaporator, the refrigerant-to-air heat exchanger 24 in the A/C mode. During compression, the low-pressure, low-temperature vapor refrigerant changes to a high-temperature, high-pressure vapor refrigerant. The high-temperature, high-pressure vapor refrigerant passes from the compressor 20 to the condenser, the refrigerant-to-liquid heat exchanger 26 in the A/C mode. In a preferred embodiment, the compressor 20 is driven by an electric direct current motor. In an exemplary embodiment, the compressor 20 is a variable speed motor-driven compressor. The motor may be driven by either direct current or alternating current electricity. As such, the compressor, and consequently, the HVAC system 8 is well equipped to operate in the A/C mode as a no-idle, i.e. engine off, HVAC system 8. The no-idle control may be in accordance with U.S. Pat. No. 6,889,762 entitled "Vehicle Air Conditioning and Heating system Providing Engine on and Engine Off Operation to Zeigler et al. The teachings and disclosure of which are incorporated herein by reference thereto.

In the A/C mode, the refrigerant-to-liquid heat exchanger 26 functions as a condenser and is disposed downstream of the compressor 20. The refrigerant-to-liquid heat exchanger 26 receives the high-temperature, high pressure vapor refrigerant from the compressor 20. While flowing through the refrigerant-to-liquid heat exchanger 26, the high-temperature, high-pressure vapor refrigerant dissipates heat to a second medium, which is a low-pressure low-temperature liquid coolant, usually a liquid that is comparable to or is a liquid engine coolant such as antifreeze. As the heat is dissipated into the second medium, the high-temperature, high-pressure vapor refrigerant undergoes a phase change by condensing into a high-temperature, high-pressure liquid refrigerant. Embodiments of the refrigerant-to-liquid heat exchanger 26 may include any type of refrigerant-to-liquid heat exchanger such as a parallel/counter flow heat exchanger, shell and tube heat exchanger, plate heat exchanger, and the like.

After passing through the refrigerant-to-liquid heat exchanger 26, the high-temperature, high-pressure liquid refrigerant passes through the first bypass valve 28, which is parallel to the second refrigerant metering device 34. In an open condition, as illustrated in FIG. 1, the first bypass valve 28 allows the high-temperature, high-pressure liquid refrigerant to bypass the second refrigerant metering device 34.

After passing through the first bypass valve 28, the high-temperature, high-pressure liquid refrigerant returns to the first refrigerant metering device 32 and the cycle is repeated. The second bypass valve 30, which is in parallel with the first refrigerant metering device 32, is in a closed condition during the A/C mode and prevents the high-temperature, high-pressure liquid refrigerant from bypassing the first refrigerant metering device 32.

During the A/C mode, the secondary loop 12 exhausts heat energy added to the refrigerant from the air in the passenger compartment as well as heat added by the compressor 20 as it converts the low-pressure low-temperature vapor refrigerant to a high-pressure high-temperature vapor refrigerant. Particularly, the added heat is transferred from the refrigerant in the primary loop 10 to the liquid coolant in the secondary loop 12 via the refrigerant-to-liquid heat exchanger 26.

The liquid coolant passing through the secondary loop 12 remains at a low pressure. The low-temperature liquid coolant upstream (with respect to the flow of the refrigerant through the secondary loop 12, indicated by arrows 68) from the refrigerant-to-liquid heat exchanger 26 passes through the refrigerant-to-liquid heat exchanger 26 while high-temperature, high-pressure vapor refrigerant of the primary loop 10 passes through the refrigerant-to-liquid heat exchanger 26. As the two fluids pass through the refrigerant-to-liquid heat exchanger 26, heat energy dissipates from the high-temperature, high pressure vapor refrigerant and is absorbed by the low-temperature liquid coolant to allow the refrigerant to condense to a liquid refrigerant, as explained previously. After the low-temperature liquid coolant absorbs heat from the primary loop 10, it exits the refrigerant-to-liquid heat exchanger 26 as a high-temperature liquid coolant.

The liquid-to-air heat exchanger 42 is disposed downstream from the refrigerant-to-liquid heat exchanger 26 and is a heat exchanging device that receives the high-temperature liquid coolant from the refrigerant-to-liquid heat exchanger 26. While flowing through the liquid-to-air heat exchanger 42, the high-temperature liquid coolant dissipates heat to a medium in close proximity, which is usually air. Furthermore, this medium typically is in fluid communication with the exterior of the vehicle. Due to the dissipation of heat, the high-temperature liquid coolant becomes an intermediate-temperature liquid coolant and exits the liquid-to-air heat exchanger 42. To increase the efficiency of this heat exchanging process between the air and the liquid, in a preferred embodiment, the liquid-to-air heat exchanger 42 is a coil.

In an embodiment, to further improve the efficiency, the second air movement device 48 is disposed proximate the liquid-to-air heat exchanger 42 and is configured to move and/or draw air through the liquid-to-air heat exchanger 42. In a preferred embodiment, the second air movement device 48 is a fan such as, for example, an axial fan similar to that of the first air movement device 36. In a further embodiment, the liquid-to-air heat exchanger 42 is positioned such that air flowing relative to the vehicle as the vehicle is moving passes through the liquid-to-air heat exchanger 42 further promoting heat transfer from the high-temperature liquid coolant to the external surrounding air. And in an even further embodiment, the liquid-to-air heat exchanger 42 is mounted to the radiator of the vehicle and uses the air flow generated to cool the engine coolant to cool the high-temperature liquid coolant in the secondary loop 12.

During the A/C mode, the intermediate-temperature liquid exiting the liquid-to-air heat exchanger 42 bypasses the secondary heat source 46 which is downstream from the liquid-to-air heat exchanger 42 to prevent unnecessary heat energy from entering the HVAC system 8. The intermediate-temperature liquid bypasses the secondary heat source 46 by passing through the third bypass valve 44, as indicated by arrow 70.

In an embodiment, after passing through the third bypass valve 44, the intermediate-temperature liquid coolant reenters and passes through a second portion of the liquid-to-air heat exchanger 42 that is downstream from the third bypass valve 44 and secondary heat source 46, to preferably dissipate additional heat energy. The intermediate-temperature liquid coolant exits the liquid-to-air heat exchanger as low-temperature liquid and passes to the liquid pump 40.

Figure 3:
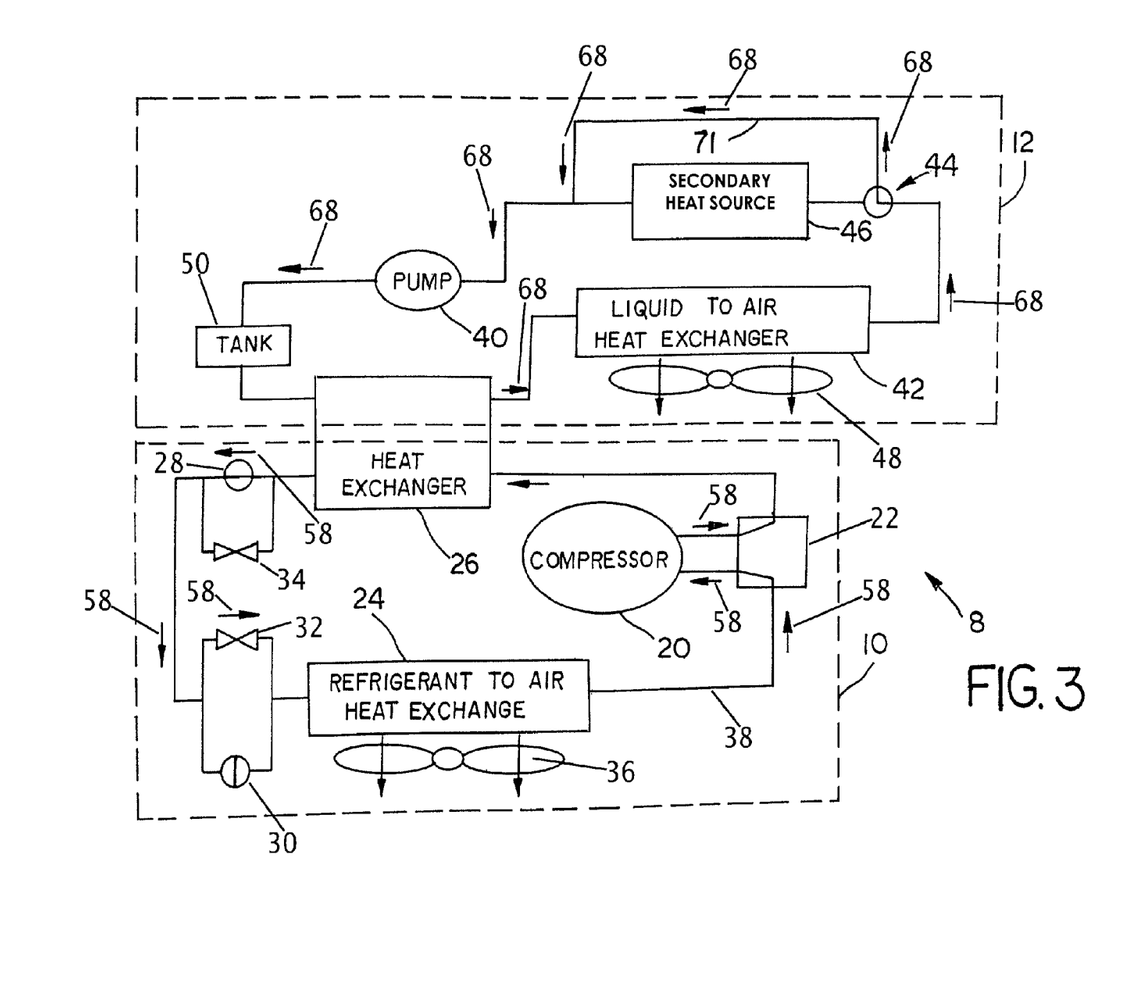
FIG. 3 is a simplified block diagram of an alternative embodiment of an HVAC system in accordance with the present invention, illustrated in a cooling mode.

In an alternative embodiment, as illustrated in FIG. 3, the liquid coolant makes only a single pass through the liquid-to-air heat exchanger 42. After exiting the liquid-to-air heat exchanger 42, the cooled liquid coolant passes through the bypass valve 44 and through a bypass loop 71 to bypass the secondary heat source 46. After bypassing the secondary heat source 46, the liquid coolant passes to the liquid pump 40. In this embodiment, the secondary heat source 46 is completely downstream from the liquid-to-air heat exchanger 42 rather than separating the liquid-to-air heat exchanger 42 into two separate portions, as in the embodiment illustrated in FIG. 1.

Returning to FIG. 1, the liquid pump 40 draws and pumps the liquid through the secondary loop 12. The liquid pump 40 is disposed downstream from the liquid-to-air heat exchanger 42 and pumps the low-temperature liquid to a purge tank 50. The liquid pump 40 may be any type of fluid pump such as, for example, a centrifugal or reciprocating pump. Further, the pump 40 is a low pressure pump such that the liquid circulating through the secondary loop 12 remains at a low pressure. In an exemplary embodiment, the liquid pump 40 is driven by an electric variable speed motor. As such, the HVAC system 8 is well equipped to operate as a no-idle, i.e. engine off, HVAC system 8.

The purge tank 50 is disposed downstream of the liquid pump 40 and functions as a holding tank for the low-temperature liquid, during the A/C mode. It further functions to allow expansion and contraction of the liquid within the secondary loop 12 thereby allowing the liquid pump 40 to maintain the low-pressure and flow rate of the liquid circulating through the secondary loop 12. As the purge tank is the last component of the secondary loop, after the liquid enters the purge tank 50, the cycle is repeated.

FIG. 2 is a simplified schematic illustration of the HVAC system 8 of an embodiment of the present invention in the heating mode. During the heating mode, the primary loop 10 dissipates heat energy to the air in the passenger compartment of the vehicle rather than to the secondary loop 12. The HVAC system 8 switches from the A/C mode to the heating mode by manipulating the previously identified bypass valves 28, 30, and 44 and the reversing valve 22. The heating process will be further described below with reference to FIG. 2.

The secondary loop 12 transfers heat energy from the secondary heat source 46 to the primary loop 10, which allows the HVAC system to be run in the heat mode at lower ambient temperatures by providing a heat load to the primary loop. As indicated previously, a heat pump operates to transfer heat from one medium to another. In a single loop heat pump, the heat pump must draw heat from a medium external to the vehicle to allow the refrigerant cycle to operate and to then transfer the heat energy to the passenger compartment. However, when the heating mode is required, the external medium is typically very cold (i.e. below freezing). It is difficult and less efficient to draw heat from a medium that has low quantities of heat. Thus, drawing heat energy from cold medium (i.e. a low ambient temperature) would cause the heat pump to operate less efficiently.

Second, during the heating cycle of a heat pump, the evaporator becomes very cold and when the evaporator is a refrigerant-to-air heat exchanger, as would be the case if the secondary loop 12 were not present, humidity in the air causes the heat exchanger, which would be exposed to the cold ambient air, to ice over. To remove the ice from the heat exchanger (evaporator) the heat pump (primary loop) typically must be operated in reverse (i.e. in the A/C mode) to melt the ice on the heat exchanger. This is highly inefficient because none of the energy being used to run the circuit in this direction would be used to heat the passenger compartment of the vehicle. Alternatively, a secondary de-icing mechanism such as a fuel fired heater or electricity resistive heater must be provided. The refrigerant-to-liquid heat exchanger 26 is not as susceptible to ice over because heat transfer into the primary loop 8 occurs internal to the heat exchanger 26 and at higher temperatures, and in some embodiments within the vehicle. The secondary loop 12 allows the secondary heat source 46 to positioned remote from the refrigerant-to-liquid heat exchanger 26.

During the heating mode, the flow of refrigerant through the primary loop 10, indicated by arrows 78, is reversed. To reverse the flow of refrigerant, the primary loop 10 includes a reversing valve 22. The reversing valve 22 switches the heat exchanger that supplies low-temperature, low-pressure vapor refrigerant to the compressor 20 and which heat exchanger receives the high-temperature, high-pressure vapor refrigerant from the compressor 20. In other words, by reversing the refrigerant flow through the primary loop 10, the refrigerant-to-air heat exchanger 24 of the primary loop 10 becomes the condenser and the refrigerant-to-liquid heat exchanger 26 becomes the evaporator.

To facilitate the reversed flow of refrigerant, the second bypass valve 32 opens allowing high-temperature, high-pressure liquid refrigerant exiting the refrigerant-to-air heat exchanger (the condenser) 24 to bypass the first refrigerant metering device 32. The first bypass valve 28 closes causing the high-temperature, high-pressure liquid refrigerant to pass through the second refrigerant metering device 34 and changing to a low-temperature, low-pressure liquid refrigerant, as explained previously with reference to the A/C mode.

In this mode, low-temperature, low-pressure liquid refrigerant passes through the refrigerant-to-liquid heat exchanger 26 to absorb heat energy from a high-temperature liquid coolant flowing through the secondary loop 12, as will be more fully explained below. This heat energy drawn from the secondary loop 12, will be dissipated to the air in the passenger compartment when high-temperature, high-pressure vapor refrigerant passes through the refrigerant-to-air heat exchanger 24. Thus, during the heating mode, the primary loop 10 operates in reverse. In this mode, energy is transferred from the secondary loop 12 to the primary loop 10 and dissipated to the passenger compartment.

During the heating mode, the flow of liquid coolant through the secondary loop 12, indicated as arrows 68, does not reverse. However, the low-pressure liquid passing through the secondary loop 12 acquires heat from the secondary heat source 46 and functions to transfer this heat energy to the primary loop 10 via the refrigerant-to-liquid heat exchanger 26, as explained previously.

In the heating mode, the low-pressure liquid coolant of the secondary loop 12 entering the refrigerant-to-liquid heat exchanger 26 is a high-temperature liquid coolant. As it passes through the refrigerant-to-liquid heat exchanger 26, the high temperature liquid coolant dissipates heat energy to the low-temperature, low-pressure refrigerant of the primary loop 10. The heat energy dissipated from the secondary loop 12 is absorbed by the refrigerant in the primary loop 10 and subsequently dissipated to the air in the passenger compartment.

In the illustrated embodiment in FIG. 2, the liquid coolant passes through the liquid-to-air heat exchanger 42 and dissipates additional heat energy from the liquid coolant to the air passing through the heat exchanger 42. After passing through the liquid-to-air heat exchanger 42, the liquid coolant passes through the secondary heat source 46. As such, the bypass valve 44 is positioned so that the liquid coolant flows to the secondary heat source 46 rather than bypassing it as in the A/C mode. As the liquid coolant passes through the secondary heat source 46, it absorbs heat energy.

In an embodiment, the secondary heat source 46 is the engine of the vehicle. It is a benefit of the HVAC system 8 that the heating system may be used to reduce the load on the engine cooling system as it is running by dissipating some of the waste heat generated by the operating engine to the passenger compartment.

In an alternative embodiment, to promote engine-off or no-idle operation of the HVAC system 8, the secondary heat source 46 is a fuel fired heat source that burns fuel to produce heat energy. A fuel fired heat source is more environmentally friendly and efficient than running a large diesel engine to provide a heat source when the full power of the primary engine of the vehicle is not required (i.e. during resting or other stationary situations). In another embodiment, the secondary heat source is a electricity resistive heater that uses electrical resistance to convert electricity to heat energy. This embodiment would be beneficial when the vehicle would typically have access to a secondary electricity supply, such as shore power. However, it should be noted that the engine of the vehicle can function as the secondary heat source after it is deactivated because it will remain warm for an extended period of time after it has been shut-off.

Furthermore, the configuration of having a secondary loop 12 allows the secondary heat source 46 which facilitates operating the primary loop 10 in the heating mode during colder weather to be positioned remote from the refrigerant-to-liquid heat exchanger 26 without requiring long refrigerant lines.

Figure 4:
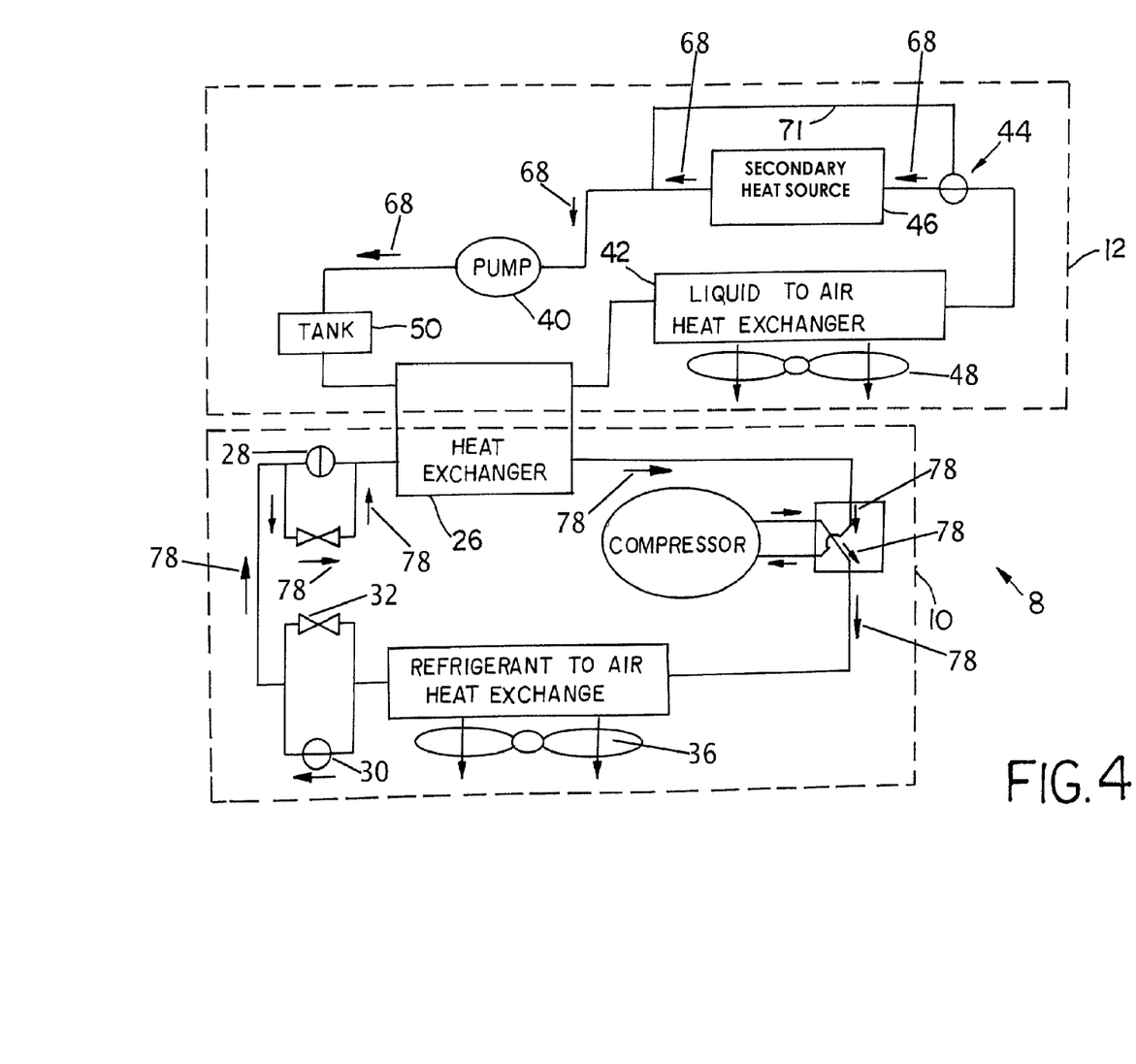
FIG. 4 is a simplified block diagram illustrating the HVAC system of FIG. 3 in a heating mode.

In the alternative embodiment described and illustrated above with reference to FIG. 3, during the heat mode illustrated in FIG. 4, the liquid coolant does not bypass the secondary heat source 46. In the heat mode, the bypass valve 44 is positioned such that the liquid coolant that exits the liquid-to-air heat exchanger 42, which in this embodiment is low-temperature liquid coolant, passes through the secondary heat source 46 and becomes a high-temperature liquid coolant. The high-temperature liquid coolant only passes through the liquid-to-air heat exchanger 42 one time. This is preferable because no heat is dissipated from the high temperature liquid coolant by passing through the liquid-to-air heat exchanger 42.

After the liquid coolant has passed through the secondary heat source 46 and becomes high-temperature coolant, it is pumped through the refrigerant-to-liquid heat exchanger 26 where the heat energy is transferred from the high-temperature liquid coolant of the secondary loop 12 to the low-temperature, low-pressure refrigerant of the primary loop 10.

It is contemplated that when the HVAC system as described above is used in large passenger vehicles, for example busses, multiple primary loops 10 may be installed in the vehicle such that more configurable localized heating and air conditioning can be achieved. Specifically, one unit may be installed to condition the air in the back of the vehicle while another unit may be installed near the front of the vehicle to condition the front of the passenger compartment. In these multiple primary loop systems, the HVAC system may include a single secondary loop coupled to the plurality of primary loops or separate secondary loops coupled to each individual primary loop.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A heating and air conditioning system of a passenger compartment of a vehicle, comprising:
a first heat exchanger;
a primary loop passing through the first heat exchanger and further comprising a compressor, a second heat exchanger, a flow reversing means for reversing the fluid flow through the first heat exchanger, and a first refrigerant metering device;
a secondary loop passing through the first heat exchanger and further comprising a liquid pump, a third heat exchanger, a secondary heat source, and a bypass means for selectively bypassing the secondary heat source;
wherein the secondary loop is thermally coupled to the primary loop by the first heat exchanger and the second heat exchanger is thermally coupled to an interior of the passenger compartment; and, further comprising a first air movement device disposed proximate the second heat exchanger so as to circulate air from the interior of the passenger compartment through the second heat exchanger.

2. The heating and air condition system of claim 1, wherein the secondary heat source is the engine of the vehicle.

3. The heating and air condition system of claim 1, wherein the secondary heat source and the third heat exchanger are remote from the primary loop and from the passenger compartment of the vehicle.

4. The heating and air conditioning system of claim 3, wherein the second heat exchanger is positioned in direct fluid communication with the interior of the passenger compartment.

5. The heating and air conditioning system of claim 1, wherein the first heat exchanger is a refrigerant-to-liquid heat exchanger, the second heat exchanger is a refrigerant-to-air heat exchanger, and the third heat exchanger is a liquid-to-air heat exchanger.

6. The heating and air condition system of claim 5, wherein the second and third heat exchangers are coils, and wherein the flow metering device is an expansion valve, the system further comprising a second air movement device disposed proximate the third heat exchanger.

7. The heating and air condition system of claim 1, wherein the compressor is a direct current motor-driven compressor.

8. The heating and air conditioning system of claim 1, wherein the secondary heat source is a fuel-fired heater.

9. The heating and air conditioning system of claim 1, wherein the primary loop is a high-pressure refrigerant circuit and the secondary loop is a low-pressure coolant circuit.

10. The heating and air conditioning system of claim 9, wherein the compressor, the first heat exchanger, the second heat exchanger, the flow reversing means, and the first refrigerant metering device are coupled by fixed connections.

11. The heating and air conditioning system of claim 10, wherein the primary loop is a modular self-contained unit adapted to be connected to the secondary loop.

12. A heating and air conditioning system of a passenger compartment of a vehicle, comprising:
a first heat exchanger;

a primary loop passing through the first heat exchanger and further comprising a compressor, a second heat exchanger, a flow reversing means for reversing the fluid flow through the primary loop, including the first heat exchanger, and a first refrigerant metering device;

a secondary loop passing through the first heat exchanger and further comprising a liquid pump, a third heat exchanger, a secondary heat source, and a bypass means for selectively bypassing the secondary heat source;

wherein the secondary loop is thermally coupled to the primary loop by the first heat exchanger and the second heat exchanger is thermally coupled to an interior of the passenger compartment; and, wherein, during a heating mode, liquid in the secondary loop passes through the secondary heat source and the flow reversing means directs refrigerant from the first heat exchanger directly to the compressor and refrigerant from the compressor directly to the second heat exchanger, and, during a cooling mode, the liquid in the secondary loop bypasses the secondary heat source and the flow reversing means directs refrigerant from the second heat exchanger directly to the compressor and refrigerant from the compressor directly to the first heat exchanger.

13. A heating and air conditioning system of a passenger compartment of a vehicle, the heating and air conditioning system comprising:

a primary loop comprising a compressor, a first heat exchanger, a second heat exchanger, and a flow reversing means for selectively directing a fluid flow from the compressor to one of the first heat exchanger and the second heat exchanger and a fluid flow to the compressor from the other of the first heat exchanger and the second heat exchanger, wherein the flow reversing means is operable to reverse the flow through at least one of the first and second heat exchangers; the primary loop further comprising refrigerant metering device such that the compressor, the first heat exchanger, the second heat exchanger, the flow reversing means, and the refrigerant metering device are coupled by fixed tubing having permanent connections to form a high pressure closed fluid circuit;

a secondary loop having a low pressure liquid coolant, the secondary loop passing through the first heat exchanger and thereby thermally communicating with the primary loop, the secondary loop further comprising a liquid pump, a third heat exchanger, a secondary heat source, and a bypass means for selectively bypassing the secondary heat-source; and, further comprising a first air movement device disposed proximate the second heat exchanger so as to circulate air from the interior of the passenger compartment through the second heat exchanger.

14. The heating and air conditioning system of claim 13, wherein the first primary loop is a self-contained unit.

15. The heating and air conditioning system of claim 14, wherein the secondary loop is coupled to the first heat exchanger with removable couplings.

16. The heating and air conditioning system of claim 13, wherein the third heat exchanger and secondary heat source are remote from the primary loop.

17. The heating and air condition system of claim 13, wherein the secondary heat source is at least one of an engine of the vehicle, a fuel fired heater, and an electrically resistive heater.

18. The heating and air condition system of claim 13, wherein the first heat exchanger is a refrigerant-to-liquid heat exchanger, the second heat exchanger is a refrigerant-to-air heat exchanger, and the third heat exchanger is a liquid-to-air heat exchanger.

19. The heating and air condition system of claim 13, wherein the compressor is a direct current motor-driven compressor, and the liquid pump is a direct current motor driven pump.

20. The heating and air conditioning system of claim 19, wherein the secondary heating source is at least one of a fuel-fired heater and an electrically resistive heater, and wherein the system further comprises electrically driven first and second air movement devices proximate to the second and third heat exchangers, respectively.

* * * * *